(12) United States Patent
Hamann et al.

(10) Patent No.: US 6,771,445 B1
(45) Date of Patent: Aug. 3, 2004

(54) ASSEMBLY AND METHOD SUITABLE FOR THERMO-MAGNETIC WRITING/READING OF DATA

(75) Inventors: Hendrik F. Hamann, Mohegan Lake, NY (US); Yves Martin, Ossining, NY (US); Hemantha Kumar Wickramasinghe, Chappaqua, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 09/540,726

(22) Filed: Mar. 31, 2000

(51) Int. Cl.[7] ................................................ G11B 5/02
(52) U.S. Cl. ...................................... 360/59; 369/44.23
(58) Field of Search ............................................ 360/59

(56) References Cited

U.S. PATENT DOCUMENTS

| | | | | |
|---|---|---|---|---|
| 5,288,999 A | * | 2/1994 | Betzig et al. | 250/227.26 |
| 5,375,087 A | * | 12/1994 | Moreland et al. | 250/306 |
| 5,463,578 A | * | 10/1995 | Gambino et al. | 360/59 |
| 6,011,664 A | * | 1/2000 | Kryder et al. | 360/59 |
| 6,101,164 A | * | 8/2000 | Kado et al. | 369/126 |
| 6,304,527 B1 | * | 10/2001 | Ito et al. | 369/126 |

* cited by examiner

Primary Examiner—David Hudspeth
Assistant Examiner—Rocio Colon
(74) Attorney, Agent, or Firm—McGinn & Gibb, PLLC; Douglas A. Millett, Esq.

(57) ABSTRACT

An assembly for writing/reading high-density data on a recording media as a series of tags comprising a magnetic information bit pattern. The assembly includes an antenna positionable near the media; a source of electromagnetic radiation for producing an incident wave at least a portion of which can be coupled to the antenna; and, a means for coordinating a mutual positioning of the source of the electromagnetic radiation and the antenna, so that the antenna can generate a highly localized electromagnetic field in the vicinity of the media for inducing localized heating of the media. The assembly is capable of writing/erasing said high-density data by using an information signal for modulating the localized field generated in the vicinity of the media; the assembly is capable of reading by coordinating the mutual positioning of the antenna and the media.

33 Claims, 5 Drawing Sheets

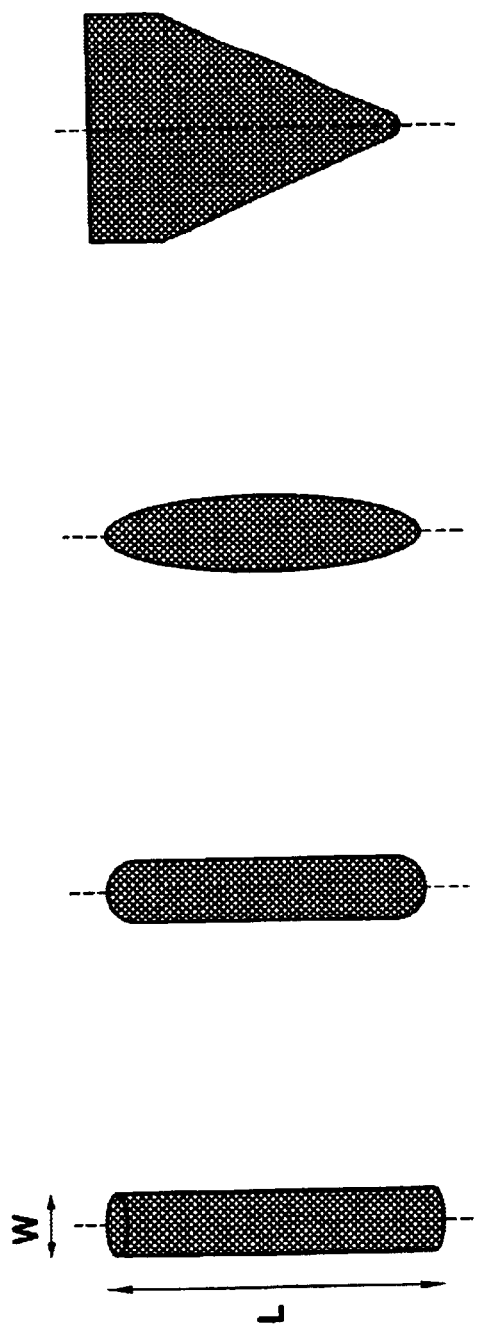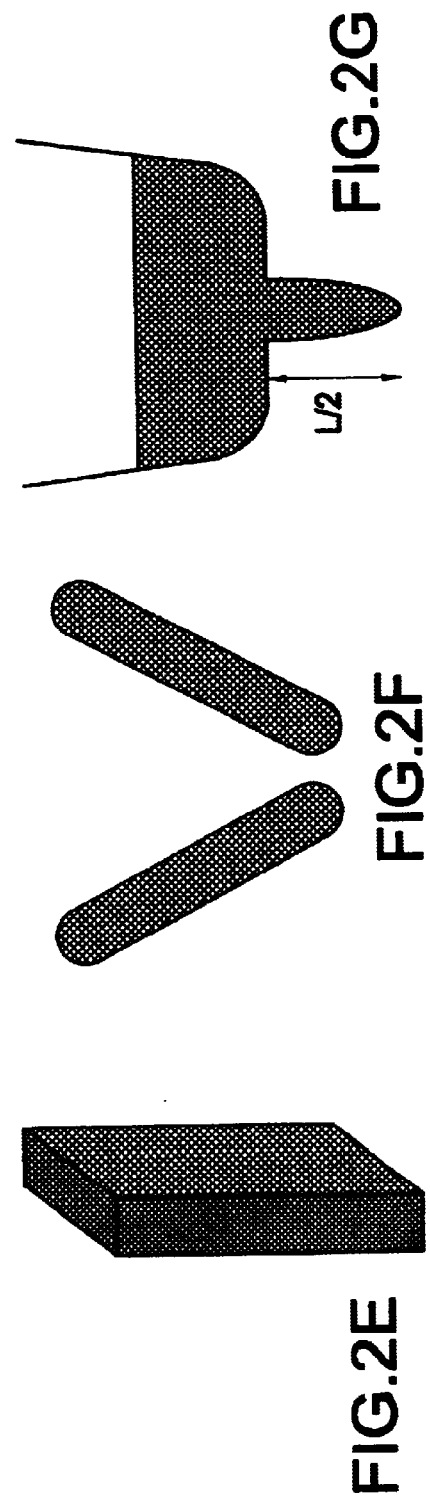

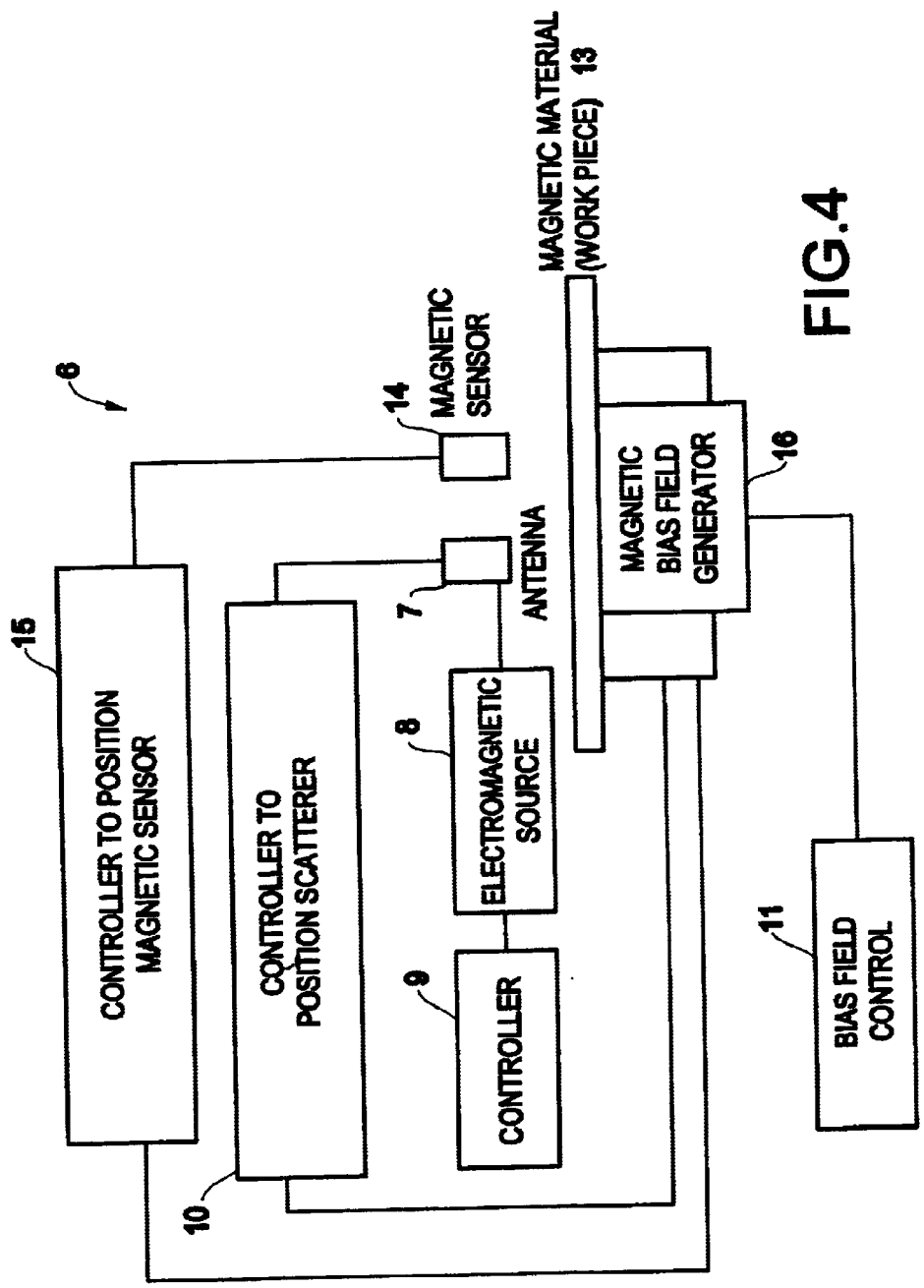

ASSEMBLY AND METHOD SUITABLE FOR THERMO-MAGNETIC WRITING/READING OF DATA

FIELD OF THE INVENTION

This invention relates to a novel assembly and method suitable for thermo-magnetic writing/reading of data.

INTRODUCTION TO THE INVENTION

The significance and novelty of the present invention and its discoveries, with respect to thermo-magnetic writing/reading, may be discerned by first referencing and setting in apposition a disparate and important recording technology, namely, classical thermo-magnetic recording utilizing a focused laser beam.

In particular, classical thermo-magnetic recording employing a focused laser beam contemplates using the focused laser beam for creating a hot spot on a thermo-magnetic material. The thermo-magnetic material, in turn, typically comprises a thin film magnetic media, which, at ambient temperature, has a high magnetic coercivity and is non-responsive to an externally applied magnetic field. However, as the focused laser beam raises the local temperature of the thin film magnetic media, the hot spot can become magnetically soft (i.e., its coercivity decreases), and eventually, at a critical point (the Curie temperature), the coercivity becomes zero. At a certain temperature, the field of the externally applied electromagnet can overcome the media's resistance to reversal, thereby switching its magnetization. Turning the laser off can bring the temperature back to normal (ambient temperature), but the reverse-magnetized domain remains frozen in the film. Recording may be realized by laser power modulation (LPM) or magnetic field modulation (MFM).

SUMMARY OF THE INVENTION

Our work includes an at least twofold evaluation of the capabilities of classical thermo-magnetic recording utilizing a focused laser beam.

In particular, we first note that this classical technique enables one to write magnetic bits with dimensions only in the micrometer range. A minimum size of these written bits can be determined by the focal spot of the laser beam (approximately 1 micrometer). However, since the minimum focal spot may be determined by the diffraction limit $$\left(\text{approximately}\left(\frac{\text{wavelength}}{2}\right)\right),$$

the storage capability of classical thermo-magnetic recording utilizing a focused laser beam, is fundamentally limited.

Second, we note that even for traditional techniques on longitudinal recording media which use exclusively a magnetic field without any heating, the concept for nanoscale heating may be very important in the future. In order to obtain stable magnetic bits, the magnetic material has to become harder and harder as the bit size decreases. Specifically, thermal stability of magnetic media is described by the thermal reversal energy, which is for an ideal material the product of the magnetic anisotropy (Ku) of the material and the volume (V) of each magnetic 'grain'. A material is considered to be thermally stable if the KuV/kT>40, where kT is the thermal energy at ambient temperature. As the bit size decreases, materials with higher Ku are needed as a recording media. Although these materials are available, they cannot be used in the traditional way, because the magnetic field from a head is not sufficient to switch them. Improvements on the field strengths of a magnetic head cannot be foreseen. Hence, the only practical way of recording on these films is to thermally assist the writing process by heating locally.

The discoveries of the present invention, in sharp contrast to the inherent and fundamental limitations of classical focused laser beam techniques, include a novel assembly and methodology which can qualitatively and advantageously transcend focused laser beam diffraction limited constraints.

In overview, the discoveries and advantages of the present invention can work to circumvent the severe diffraction limited constraints, by using direct electromagnetic coupling between an antenna and a magnetic thin film media. In this novel methodology, heat may be developed by way of the electromagnetic coupling and directly and locally deposited onto the magnetic thin film media or surface on a submicroscopic scale. Preferably, a novel nanoscale antenna or probe guides electromagnetic energy and amplifies and focuses it onto the thermo-magnetic media, typically in the presence of a magnetic bias field. Since the area of the local heating on the surface may be determined approximately by the dimensions of the antenna, magnetic bits may be written which are substantially below 0.1 micrometer, i.e., far below the diffraction limit. Consequently, the discoveries of the present invention, in contrast to classical prior art diffraction limited techniques, can realize significant improvements in data storage densities (approximately by a factor of 10 or larger). Moreover, since the writing speed is governed by thermal diffusion, very high and competitive writing speeds of approximately greater than 100 MHz, can be achieved.

These important aspects relating to the discoveries of the present invention, are usefully restated and reinforced by the following considerations.

In general, the present invention focuses on high density as well as high speed data recording.

With respect to high density, we note the following: The present invention uses the idea of direct electromagnetic coupling between an antenna and a magnetic thin film media. The direct electromagnetic coupling can subsume far-field and preferably near-field effects (see below), in order to heat the thin film media, preferably on a very local scale. This scale, in turn, can be made to correlate to the dimensions of the antenna, which can be easily less than 10,000 A°, e.g., 100 A°. Consequently, the magnetic bits written with this coupling can be significantly smaller than the magnetic bits written by conventional or classical techniques; for example, the preferred near-field coupling can translate into data storage densities of approximately greater than 100 Gbit/inch$^2$, for example, 400 Gbit/inch$^2$.

With respect to high speed data recording, the writing speed realized by this invention can be very high, because it is basically limited by the thermal diffusion length $l=(\kappa xt)^{0.5}$, where $\kappa$ is the thermal diffusivity and t is the time after the arrival of a heating pulse. Specifically, the heat in a good thermal conductor (approximately $\kappa=2\cdot10^{-5}$ m$^2$/s) can diffuse a distance of 0.45 micrometer in only approximately 10 ns corresponding to data recording rates of 100 MHz (C. A. Paddock et al., J. Appl. Phys. 60, 285 (1986)). It should be pointed out that the heat diffusion speed increases considering a three-dimensional heat flow, which promises even higher data recording rates.

Accordingly, pursuant to a first aspect of the present invention, we disclose a novel assembly for writing/reading high-density data on a recording media as a series of tags comprising a magnetic information bit pattern, the assembly comprising:

1) an antenna positionable near the media;
2) a source of electromagnetic radiation for producing an incident wave at least a portion of which can be coupled to the antenna; and
3) means for coordinating a mutual positioning of the source of the electromagnetic radiation and the antenna, so that the antenna can generate a highly localized electromagnetic field in the vicinity of the media for inducing localized heating of the media; the assembly capable of writing/erasing said high-density data by using an information signal for modulating the localized electromagnetic field generated in the vicinity of the media;

the assembly capable of reading by coordinating the mutual positioning of the antenna and the media.

In a second aspect of the present invention, we disclose a novel method for writing/erasing high-density data on a recording media as a series of tags comprising a magnetic information bit pattern, the method comprising the steps of:

1) positioning an antenna near the media;
2) generating an incident electromagnetic wave for coupling to the antenna;
3) coordinating a mutual positioning of the incident electromagnetic wave and the antenna for generating a highly localized electromagnetic field in the vicinity of the media, for thereby inducing localized heating of the media; and
4) writing/erasing said high-density data by using an information signal for modulating the localized electromagnetic field generated in the vicinity of the media.

BRIEF DESCRIPTION OF THE DRAWING

The invention is illustrated in the accompanying drawing (not drawn to scale), in which:

FIGS. 2a–g show alternative and illustrative embodiments of an antenna utilized in the FIG. 1 assembly;

FIG. 4 shows a second assembly that can be built in accordance with principles of the present invention.

DETAILED DESCRIPTION OF THE INVENTION

Figure 1:
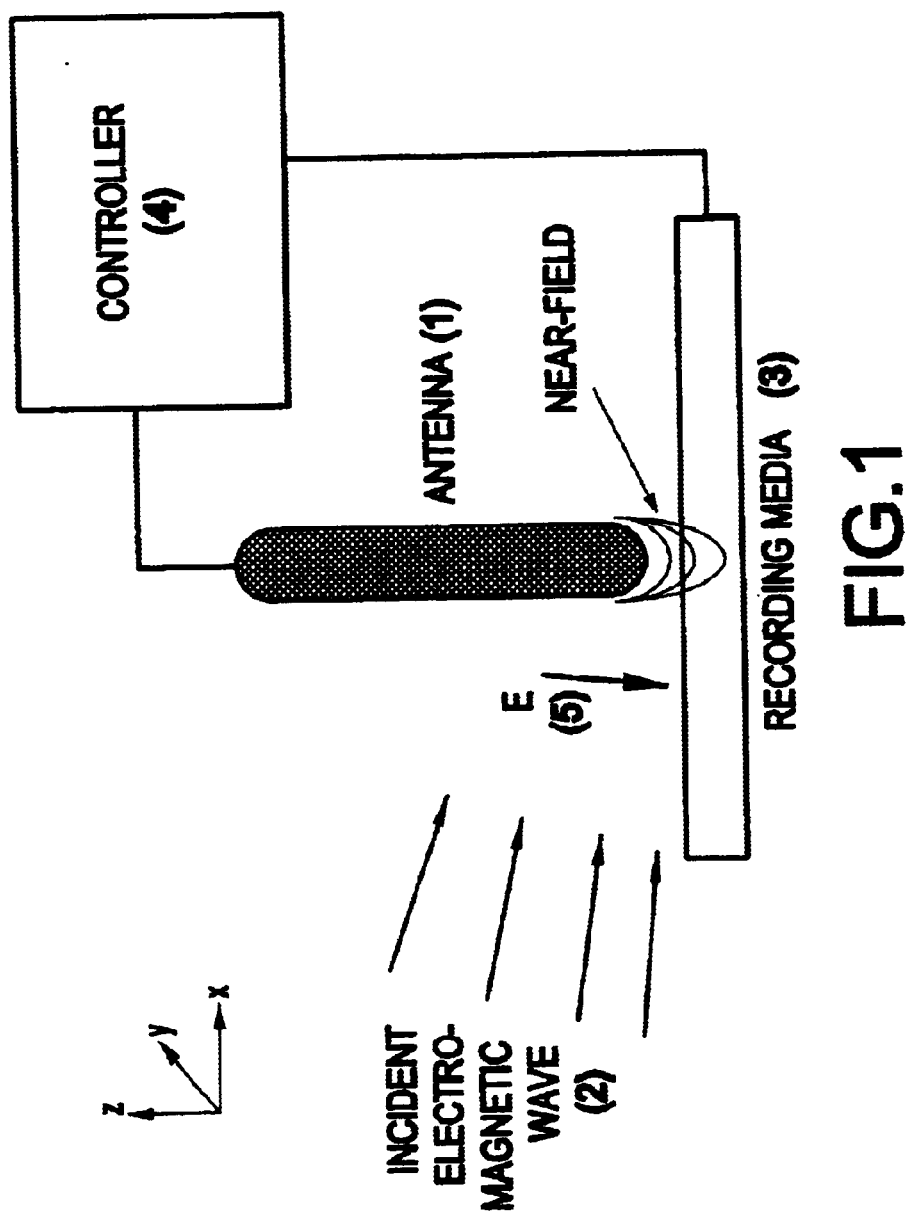
FIG. 1 shows a first assembly that can be built in accordance with principles of the present invention.

The detailed description of the invention proceeds by first developing important conceptual aspects of the invention, and then articulating various preferred or alternative embodiments of first and second assemblies of the present invention.

In overview, the present invention can circumvent the diffraction limit by near-field methods. Preferably, an antenna comprising a nanometric scattering solid (or scatterer) may be excited with an electromagnetic field such as a laser beam, to thereby generate an enhanced and highly localized electromagnetic field in the near vicinity of a recording media. By optimizing shape, size, and material type of the antenna and recording media, as well as choosing the best geometry, polarization, and wavelength for the exciting electromagnetic field, one can generate an electromagnetic near-field source with a substantially larger magnitude than the original exciting field. This near-field is also highly localized to the immediate area near the antenna. An important idea of this invention is to use this strongly enhanced and highly localized electromagnetic near-field to directly heat the recording media, in order to write information patterns.

From a physics point of view, this enhancement is due to the oscillating charges within the antenna. At some point during the oscillation, charges accumulate at the end of the antenna which can result into an enhanced near-field. In a slightly different way of looking at this, the incident field lines have to match the boundary conditions of the antenna and recording media (field lines are mostly perpendicular to the boundary). Hence, at a sharp point all the field lines are concentrated and give rise to an enhanced near-field at the end of the antenna, which acts as a lightening rod for the incident wave. This effect is enhanced when the gap between antenna and recording media is kept small, which is generally the case for the gap between writing head and media in magnetic recording. In addition to this geometric enhancement, electromagnetic resonance in the antenna/media system can further enhance near-fields. Antenna-like resonance, obtained by optimizing the geometry of the materials (especially the length of the antenna), or surface plasmon resonance (charge density waves), excited by operating at certain frequency ranges for selected types of material (for example, silver, gold, aluminum) with given shape and size, can induce further enhancement.

Theoretical calculations have shown that this enhanced near-field extends substantially into the media, even if it is conducting. Heat is therefore generated throughout the film, in a direct manner. Because of the small dimensions involved (calculations have shown that heating regions smaller than 20 nm are feasible), time constants for heating and cooling are extremely fast (nanosecond) and operating frequencies may reach into the GHz regime. Furthermore, by appropriately choosing the antenna and media material, one can maximize heat deposition in the film and minimize heating the antenna (and therefore of the recording head).

DETAILED DESCRIPTION

A first assembly of the present invention, of the type shown in FIG. 1 (numerals 1–4), preferably includes four major components:

1) a nanometric antenna (1) of the right geometry (shape size) and material designed to achieve strongly enhanced and highly localized near-fields;
2) an electromagnetic source (2) (such as a laser beam) for exciting the antenna (1) with proper direction, polarization, and wavelength, and adequately focused;
3) a recording media (3), which may be heated by the enhanced and localized near-field at the end of the antenna (1); and
4) a means for controlling (4) the positioning of the antenna (1) with respect to the recording media (3).

We now look at preferred aspects of each of these four components:

1) Antenna: An important component of the assembly preferably is a nanometric antenna which can amplify an incident laser field, preferably in its near-field zone. The detail of the geometry and material type for this antenna is important in order to ensure maximum field enhancement.

Various kinds of antenna shapes may be implemented. However, in practice, three different considerations help determine an actual design. 1) The antenna structure preferably is elongated, such as an ellipsoid, rod, cylinder, or pyramid. For example, typically the near-field enhancement of a sphere is significantly less than of an ellipsoid of equal volume and material. 2) The antenna preferably has a sharp point at its end, or several sharp points (typically aligned with the electromagnetic field direction), which can focus the incident field lines right to the point. The radius or size of the point should typically be in the 10 to 100nm range, and comparable to the size of the bits to be recorded in the media. 3) It preferably is a material with a substantially high dielectric index, to focus the field at the operation frequency, and possibly with a low conductivity to minimize heating of the antenna (example: tungsten, aluminum, gold, silver, and other noble metals may also be good candidates). 4) The actual size of the antenna is preferably chosen to be smaller than the wavelength $\lambda$ of the excitation light, to optimize antenna and/or plasmon resonance, and avoid phase difference between the dipoles within the antenna. Finite element simulations show that for most structures, an antenna like resonance enhancement may be achieved when the long axis is 0.15–0.25$\lambda$. Such a small antenna could be made by metallic deposition on or inside a transparent substrate. It can also be obtained by adding a small metallic protrusion to a larger metallic base holder. In this last case, the electrical impedance mismatch between the base and the antenna is equivalent to reducing the size of the small antenna. Shape also may be optimized, to maximize the effect of plasmon resonance. For example, at a wavelength $\lambda$=652.2 nm, a silver ellipsoid antenna preferably has an aspect ratio (length over width) of 5 to produce a maximum near-field enhancement.

2) Laser beam: The antenna (1) preferably is excited by a laser beam of proper direction, focus, polarization, and wavelength. Direction, focus, and polarization are preferably chosen to excite the antenna (1) along its long axis. A few general solutions are:
   a) antenna vertical and illumination from the side with a plane wave or focused wave, with vertical polarization;
   b) antenna tilted over the media, and illumination from the top with a plane wave or focused wave, with polarization along the length of the antenna. Here, a large fraction of the horizontal field is converted to a vertical field between the antenna and media, leading to a substantial component of the vertical field within the media;
   c) antenna vertical and illumination from the top with a radial or semi-radial beam; or
   d) evanescent wave illumination, from the other side of the media. In all these cases, an illumination optics can make use of conventional bulk optical components (lenses, mirrors) or integrated components (optical fibers, optical micro-strips). The choice of the wavelength may require matching to the length of the antenna (length~0.1 to 0.25$\lambda$, see above). In a typical application, the source or laser may be modulated in order to write the information on the recording media.

3) Recording media: The recording media (3) can include different kinds, that allows information to be stored by heating or heat-assisted writing. Examples are: magnetic and magneto-optic media, phase change media, thermoplastic polymers. Index of refraction and conductivity preferably are substantial, in order to crowd field lines from the antenna and to allow direct electromagnetic heating. Typical suitable magnetic media include cobalt-chrom, platinum-iron, platinum-cobalt, terbium-iron. Some polymers can be made with sufficiently high dielectric and conducting properties.

4) Controller: This invention includes a controller (4) to mutually position the antenna (1) with respect to the recording media (3). A preferred application of the invention is to incorporate the antenna and electromagnetic radiation input (through optical fiber, or r.f. microstrip) directly in the head of a conventional magnetic-recording system. The small size of these components are important to this application. Preferably, an electronic system and/or air bearing mechanism can control the position and height of the head over a recording media. The small gap between head and media contributes advantageously to the need of positioning the antenna at a close distance from the recording media (typically 20 nm or less). In a very different application, the antenna could be part of an atomic force microscope probe, where the controller is an atomic force microscope.

Diagrams With Description

FIG. 1: overall diagram of an illustrative first assembly of the present invention (numerals 1–5).

FIG. 2: illustrative shape and dimensions of antennas. The antenna is typically attached to the recording head. The antenna may be embedded inside the recording head. Part of the head is preferably made transparent to the incident electromagnetic radiation.

a is the simplest shape: cylinder with flat ends. Length L and aspect ratio L/W may be matched to the wavelength $\lambda$ to produce antenna and/or plasmon resonance. Example, for a good conductor, L=$\lambda$/2 approximately. For gold, L is typically between 0.15 and 0.25 $\lambda$ to produce plasmon resonance.

b, c, d, cylindrical shapes, with rounded or pointed ends, for further enhancing the field locally (but they are more difficult to fabricate).

In particular:
  b cylinder with rounded or pointed ends, higher local field enhancement at ends;
  c ellipsoid, produces even higher local field at ends which can be calculated algebraically in some limited cases;
  d pointed triangular shape, enhances the lighting rod effect at the pointed end;
  e above shapes can also have a non-cylindrical symmetry, in order to heat a more elongated region of the media; for example, a rectangular region with this rectangular cross-section antenna;
  f combination of several of the above antennas;
  g resonating antenna, obtained by adding a small protrusion, having "half" of any of the above shapes: half ellipsoid, half cylinder, etc. The length of the small protrusion is typically half the length of the self-standing antenna to produce resonance.

FIG. 3. Type of electromagnetic radiation input and associated geometries. The incident electromagnetic radiation is typically a focused laser or microwave radiation.

Figure 3A:
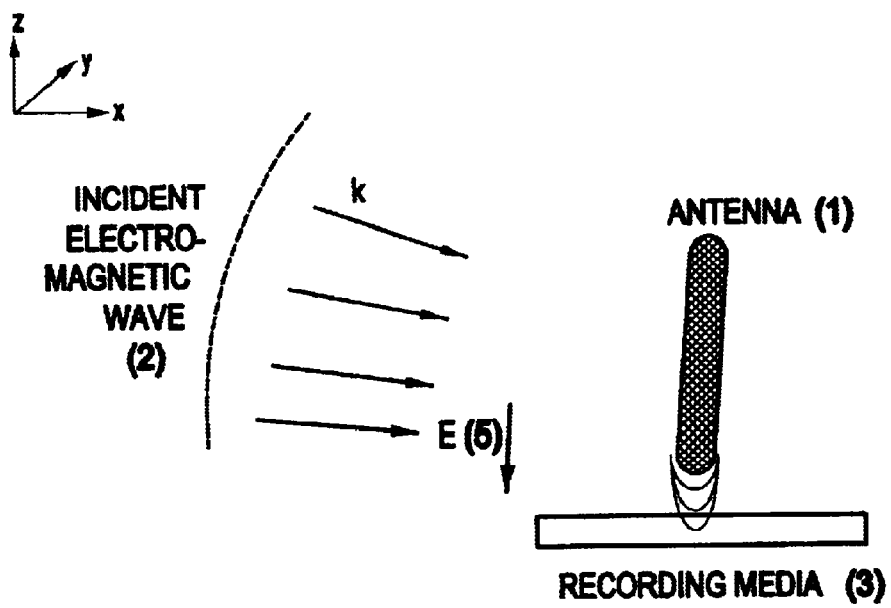
FIGS. 3a–d show illustrative manifestations of FIG. 1 assembly operation.

FIG. 3a side illumination. Propagation direction is indicated by the k vectors and is mostly horizontal (along x). Electrical vector direction (or polarization direction) is indicated by the E vector (5) and is mostly vertical (along z). The antenna is preferably aligned along the vertical direction z.

Figure 3B:
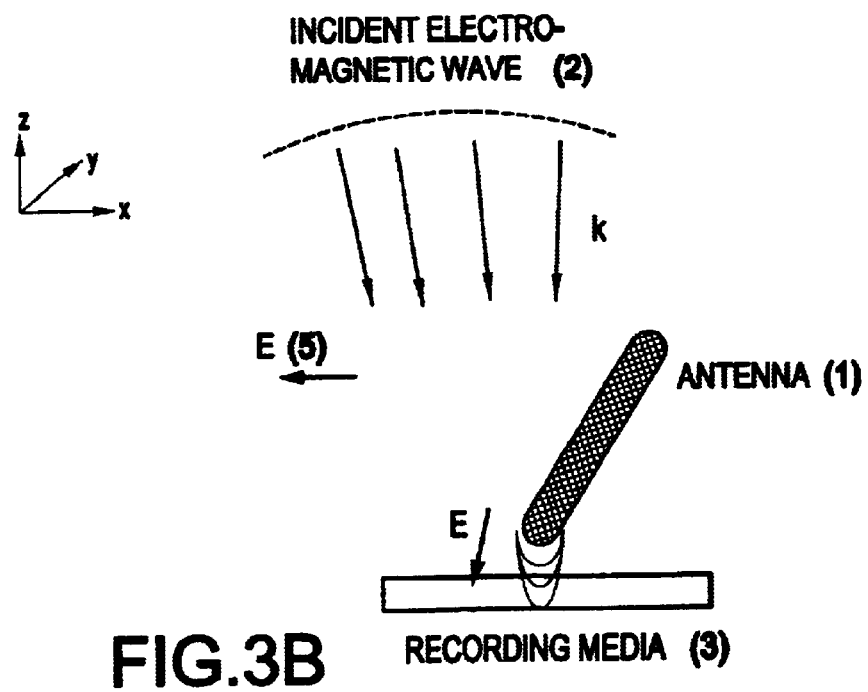

FIG. 3b vertical illumination. Propagation is mostly vertical (z), electrical vector is mostly horizontal (x), antenna is typically tilted at 45 degrees between z and x direction. A significant portion of the horizontal incident electric field is converted to a vertical field by the antenna in the near-field region between antenna and media. This vertical near-field is the predominant source for local heating of the media.

Figure 3C:
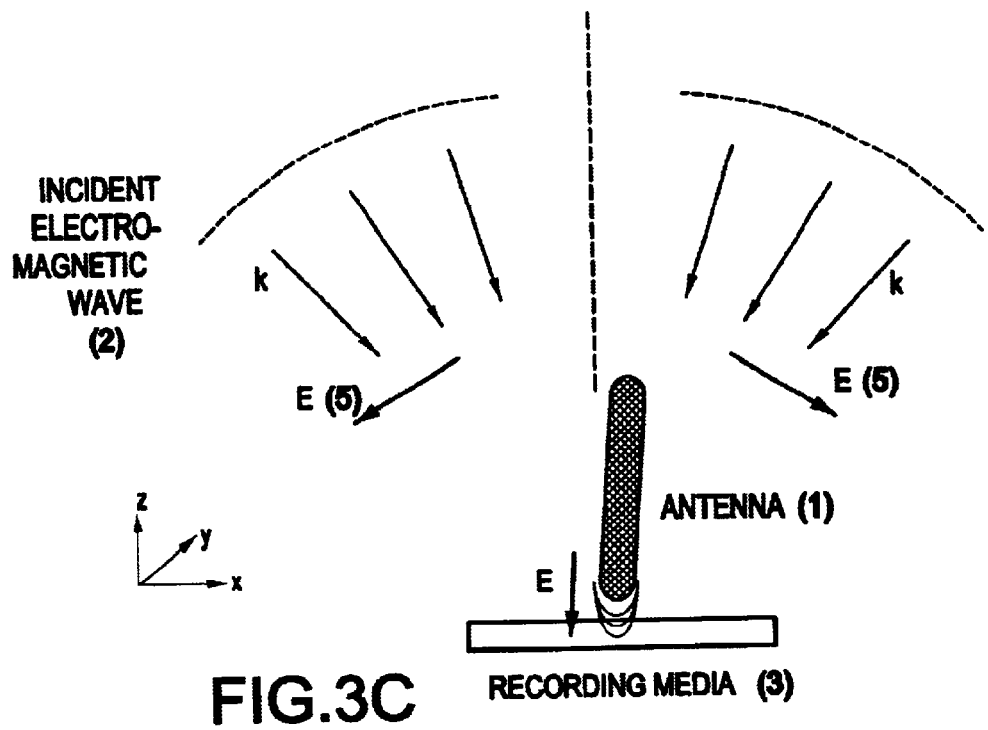

FIG. 3c illumination by a combination of focused sources, or by a radial beam or semi-radial beam [Novotny et al.]. The illumination and the antenna are mostly vertical (z), but the symmetry in the illumination is broken to produce a vertical component of the electric field.

Figure 3D:
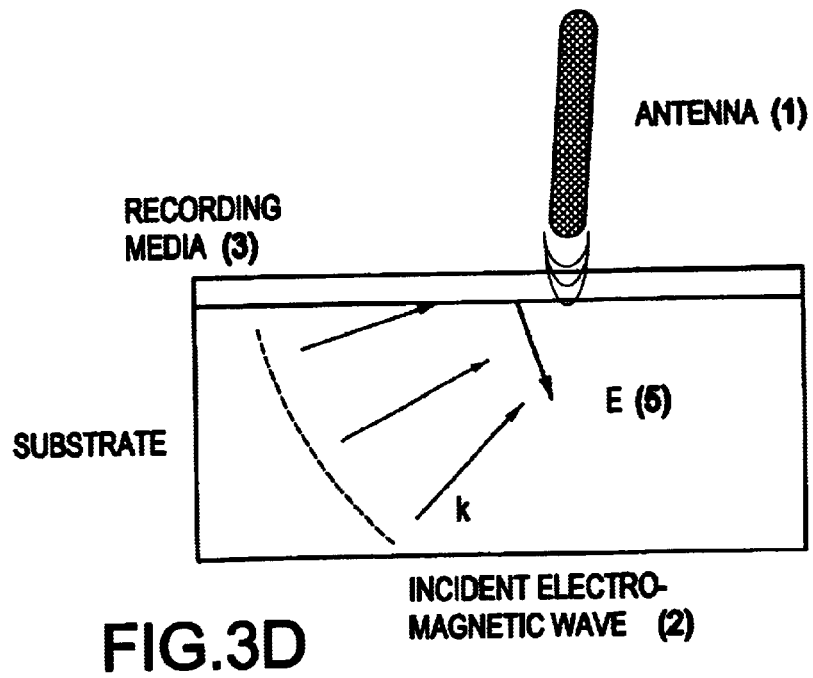

FIG. 3d illumination from the other side of the magnetic media, when the media and substrate are sufficiently transparent. One particular case is TIR (total internal reflection) illumination.

In most cases, particularly a, b, and c, illumination can be provided by a guided wave, for example, an optical fiber guided laser beam. Provision should be made to obtain the polarization direction described in each case, either by use of polarization preserving fiber, or some other conventional means of polarization adjustment.

Attention is finally directed to FIG. 4, which shows a second illustrative assembly (numerals 6–16) of the present invention, the second assembly (6) introducing some additional components and capabilities based on the canonical FIG. 1 assembly.

In particular, we note in FIG. 4 a magnetic bias field generator 16, introduced, in part, so that the assembly 6 can write/erase high density on the magnetic material 13, by the action of using an information signal for modulating the magnetic bias field. The magnetic bias field can be global, local, pulsed, or permanent. FIG. 4 also introduces a magnetic sensor 14, and its position controller 15, which can enable the assembly to read data written on the magnetic material 13, by coordinating the initial positioning of the magnetic sensor 14 and the magnetic material 13. Read out methods may include any magnetic sensitive sensing or magnetic force sensing, near-field optical sensing or magnetic induction sensing. An important feature of the present invention is that the magnetic sensor comprises the same type of element as the optical antenna; for example, they may each comprise a magentic force microscope, i.e. an MFM probe may be used as the thermal heater.

What is claimed:

1. An assembly for writing/erasing high-density data on a recording medium as a series of tags comprising a magnetic information bit pattern, the assembly comprising:
   an antenna positionable near the medium;
   a source of electromagnetic radiation for producing an incident wave at least a portion of which can be coupled to the antenna to induce an electromagnetic field therein; and
   means for coordinating a mutual positioning of the source of electromagnetic radiation and the antenna, so that the electromagnetic field of the antenna can generate a highly localized electromagnetic field in the vicinity of the medium for inducing localized heating of the media medium due to the highly localized electromagnetic field;
   the assembly capable of writing/erasing said high-density data by using an information signal for modulating the localized electromagnetic field generated in the vicinity of the medium.

2. An assembly according to claim 1, wherein the antenna has nanometric dimensions.

3. An assembly according to claim 1, wherein the antenna is associated with a recording head.

4. An assembly according to claim 1, wherein the antenna has a size that is smaller than a wavelength $\lambda$ of the source of electromagnetic radiation.

5. An assembly according to claim 1, wherein the antenna is elongated and has a shape selected from the group consisting of an ellipsoid geometry, a rod, a cylinder, and a pyramid.

6. An assembly according to claim 5, wherein the antenna has at least one sharp point at an end, the radius of the point being from 10 nm to 100 nm.

7. An assembly according to claim 1, wherein the antenna material has a high dielectric index.

8. An assembly according to claim 1, wherein the antenna comprises a magnetic material.

9. An assembly according to claim 1, wherein the source of electromagnetic radiation is within the optical portion of the electromagnetic spectrum.

10. An assembly according to claim 1, wherein the source of electromagnetic radiation is within the ultra-violet portion of the electromagnetic spectrum.

11. An assembly according to claim 1, wherein the source of electromagnetic radiation is within the infra-red portion of the electromagnetic spectrum.

12. An assembly according to claim 1, wherein the means for coordinating the mutual positioning of the source of electromagnetic radiation and the antenna comprises an air-bearing mechanism.

13. An assembly according to claim 1, wherein the means for coordinating the mutual positioning of the source of the electromagnetic radiation and the antenna enables the antenna to generate a substantially near-field electromagnetic coupling between the antenna and the medium.

14. An assembly according to claim 1, further comprising means for applying a magnetic bias field on the medium.

15. An assembly according to claim 14, further comprising means for using an information signal for modulating the magnetic bias field, to thereby write/erase high density data on the medium.

16. An assembly according to claim 1, further comprising a sensor, and wherein the assembly is capable of reading high-density data from the recording medium by coordinating the mutual position of the sensor and the medium.

17. An assembly according to claim 16, wherein the sensor reads by magnetic sensitive sensing.

18. An assembly according to claim 16, wherein the sensor reads by magnetic force sensing.

19. An assembly according to claim 16, wherein the sensor reads by magnetic tunneling sensing.

20. An assembly according to claim 16, wherein the sensor reads by near-field optical sensing.

21. An assembly according to claim 16, wherein the sensor reads by magnetic induction sensing.

22. A method for writing/erasing high-density data on a recording medium as a series of tags comprising a magnetic information bit pattern, the method comprising:
   positioning an antenna near the medium;
   generating an incident electromagnetic wave for coupling to the antenna;
   coordinating a mutual positioning of the incident electromagnetic wave and the antenna for generating a highly localized electromagnetic field in the vicinity of the medium, for thereby inducing localized heating of the medium due to the highly localized electromagnetic field; and
   writing/erasing said high-density data by using an information signal for modulating the localized electromagnetic field generated in the vicinity of the medium.

23. A method according to claim 22, wherein the antenna has nanometric dimensions.

24. A method according to claim 22, wherein the antenna comprises a magnetic material.

25. A method according to claim 22, wherein said generating comprises using a laser for generating the incident electromagnetic wave.

26. A method according to claim 22, wherein said generating comprises generating the incident electromagnetic wave for coupling to the antenna along its long axis.

27. A method according to claim 22, wherein said generating comprises generating the incident electromagnetic wave for coupling to the antenna, wherein the antenna is vertical and illumination is from the side with a plane wave and vertical polarization.

28. A method according to claim 22, wherein said generating comprises generating the incident electromagnetic wave for coupling to the antenna, wherein the antenna is tilted over the medium, and illumination is from the top with a plane wave, with polarization along the length of the antenna.

29. A method according to claim 22, wherein said coordinating comprises coordinating the mutual positioning of the incident electromagnetic wave and the antenna for generating a substantially near-field electromagnetic coupling between the antenna and the medium.

30. A method according to claim 22, further comprising applying a magnetic bias field on the medium so that writing/erasing high-density data is enabled by using an information signal for modulating the magnetic bias field.

31. A method according to claim 22, further comprising providing a magnetic bias field on the medium by magnetizing the anntenna and positioning the magnetized antenna near the medium.

32. A method according to claim 22, further comprising:
positioning a sensor near the medium; and
reading high density data from the medium via the sensor.

33. A method according to claim 22, further comprising selecting at tip for the antenna to match a radiation wavelength of the localized electromagnetic field.

* * * * *